United States Patent
Thomas et al.

(10) Patent No.: US 8,646,035 B1
(45) Date of Patent: Feb. 4, 2014

(54) PARALLEL RESTRICTED INTEGRATED SIGN ON SYSTEM AND METHOD

(75) Inventors: Ralph S. Thomas, Belton, MO (US); Elton Tila, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 189 days.

(21) Appl. No.: 13/213,049

(22) Filed: Aug. 18, 2011

(51) Int. Cl.
*H04L 29/06* (2006.01)

(52) U.S. Cl.
USPC .................................. 726/2; 726/8

(58) Field of Classification Search
USPC .................................. 726/6, 8, 29
See application file for complete search history.

(56) References Cited

U.S. PATENT DOCUMENTS

| | | | | |
|---|---|---|---|---|
| 2009/0249439 A1* | 10/2009 | Olden et al. | ...................... | 726/1 |
| 2009/0271472 A1* | 10/2009 | Scheifler et al. | .............. | 709/202 |
| 2010/0031317 A1* | 2/2010 | Mason et al. | ...................... | 726/3 |
| 2011/0202989 A1* | 8/2011 | Otranen et al. | .................... | 726/8 |
| 2011/0247053 A1* | 10/2011 | Pugh | ................................ | 726/4 |
| 2012/0023573 A1* | 1/2012 | Shi | .................................. | 726/17 |

* cited by examiner

*Primary Examiner* — Edward Zee
*Assistant Examiner* — Chi Nguy

(57) ABSTRACT

A method for accessing an application on an internal network comprises configuring a first host name in a computer as associated with an internal network. A second host name in the computer is configured as associated with an external data communication network, where the second host name is an alias that resolves to an internet protocol address of an authentication server in the internal network. A first application hosted over the internal network is invoked. In response to the invocation of the first application, a request to invoke the first application including stored user authentication credentials is transmitted to the authentication server. A restricted application hosted over the internal network is invoked where the invocation command includes the second host name. In response to the invocation of the restricted application, a request that does not include user authentication credentials is transmitted to invoke the restricted application to the authentication server.

18 Claims, 4 Drawing Sheets

PARALLEL RESTRICTED INTEGRATED SIGN ON SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Single sign on is a property of access control of multiple related, but independent software systems. With this property a user logs in once and gains access to all systems without being prompted to log in again at each of them. As different applications and resources support different authentication mechanisms, single sign on internally translates to and stores different credentials compared to what is used for initial authentication.

SUMMARY

In an embodiment, a method for securely accessing an application on an internal network is disclosed. The method comprises configuring a first host name in a computer as associated with an internal data communication network, where the internal data network comprises a communication network linking a plurality of computers whose internet protocol addresses are separated from the public internet by at least one firewall. A second host name in the computer is configured as associated with an external data communication network, where the second host name is an alias that resolves to an internet protocol address of an authentication server in the internal network. A first application hosted over the internal data communication network is invoked, where the invocation command includes a third host name that is related to the first host name and resolves to the internet protocol address of the authentication server. In response to the invocation of the first application, a request to invoke the first application including stored user authentication credentials is transmitted to the authentication server based on the third host name provided by the first application invocation command. A restricted application hosted over the internal data communication network is invoked where the invocation command includes the second host name. In response to the invocation of the restricted application, a request that does not include user authentication credentials is transmitted to invoke the restricted application to the authentication server based on the second host name provided by the restricted application invocation command.

In an embodiment, a system for securely accessing an application on a communication service provider data network from a computer outside the firewall of the communication service provider data network is disclosed. The communication service provider data network comprises a data network linking a plurality of computers whose internet protocol addresses are separated from the public Internet by at least one firewall. The system comprises a computer system having a browser application configured to provide filtered treatment to a restricted application hosted over the communication service provider data network, wherein, after an initial user sign on, the browser application, in response to invoking one of a first plurality of applications hosted over the communication service provider data network, forwards user authentication credentials to an authentication server based on a first host name provided by a first application invocation command. The authentication server is coupled to the communication service provider data network and promotes single sign-on to at least two applications hosted over via the communication service provider data network. Further, the application, in response to invoking the restricted application does not forward user authentication credentials to the authentication server based on an aliased host name provided by the restricted application invocation command, wherein the restricted application is not one of the first plurality of applications.

In an embodiment, a system for securely accessing an application on an internal network is disclosed. The system comprises an internal data communication network, an authentication server coupled to the internal data communication network, and a computer system having a browser application. The internal data communication network comprises a communication network linking a plurality of computers whose internet protocol addresses are separated from the public internet by at least one firewall. The authentication server coupled to the internal data communication network promotes single sign-on to at least two applications hosted over the internal data communication network. The browser application on the computer system is configured to provide filtered treatment to a restricted application hosted over the internal data communication network, where, after an initial user sign on, the browser application, in response to invoking one of a first plurality of applications hosted over the internal data communication network, forwards user authentication credentials to the authentication server based on a first host name provided by a first application invocation command. In response to invoking the restricted application the browser application does not forward user authentication credentials to the authentication server based on an aliased host name provided by the restricted application invocation command, where the restricted application is not one of the first plurality of applications.

In an embodiment, a method for securely accessing an application on an internal network is disclosed. The method comprises configuring a first host name in a computer as associated with an internal data communication network, where the internal data network comprises a communication network liking a plurality of computers whose internet protocol addresses are separated from the public internet by at least one firewall. The computer is configured to alias a second host name to resolve to the internet protocol address of an authentication server in the internal network, where the second host name is related to the first host name. The second host name in the computer is configured as associated with an external data communication network. A first application hosted over the internal data communication network is invoked via a browser executing on the computer, where the invocation command includes a third host name that is related to the first host name and resolves to the internet protocol address of the authentication server. In response to the invocation of the first application, a request to invoke the first application including stored user authentication credentials is automatically transmitted by the browser to the authentication server based on the third host name provided by the first application invocation command. A restricted application hosted over the internal data communication network is invoked via the browser, where the invocation command includes the second host name. In response to the invocation of the restricted application, a request to invoke the restricted application that does not include stored user authentication credentials is automatically transmitted by the browser to the authentication server based on the second host name provided by the restricted application invocation command.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
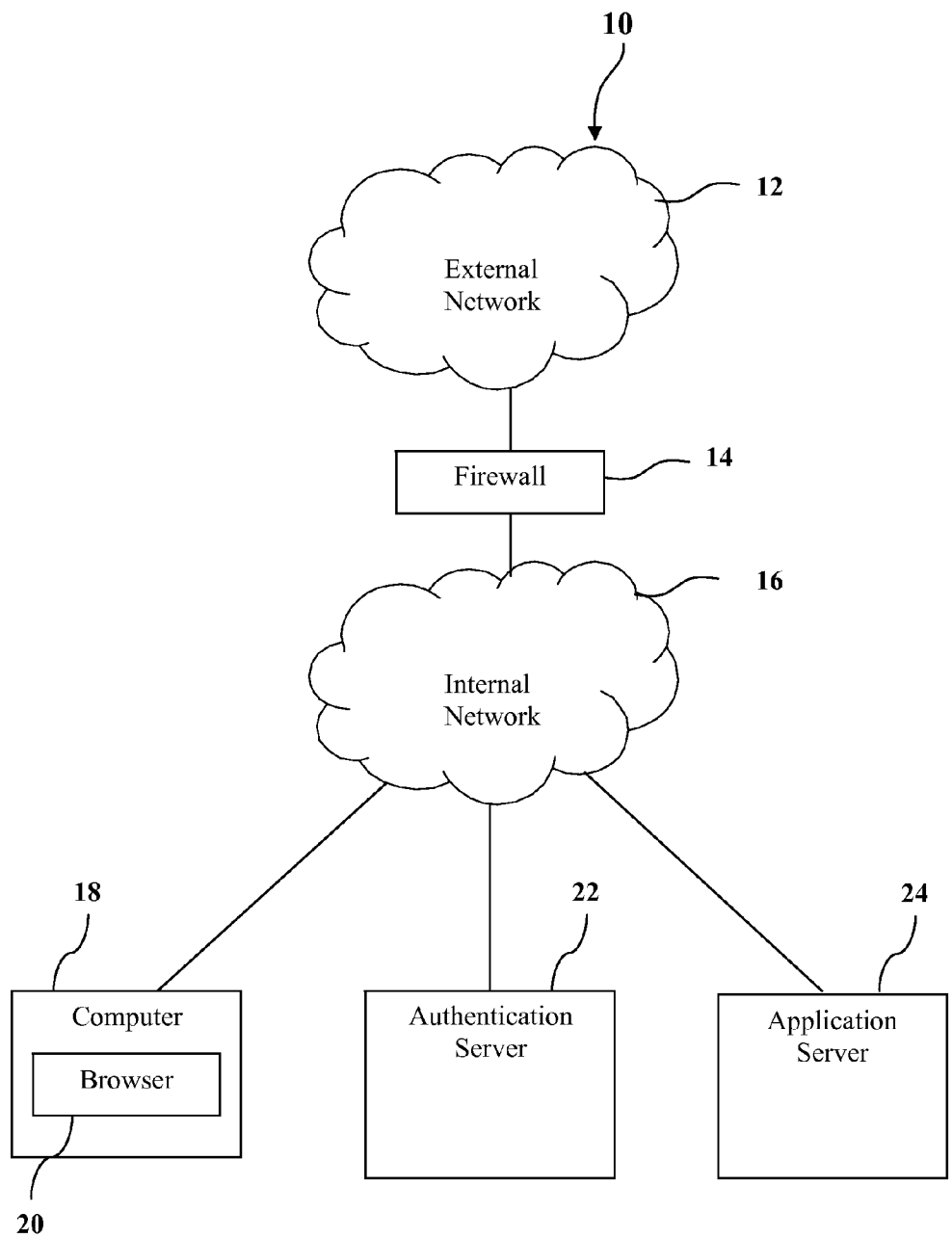
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for securely accessing an application on an internal network is described. In an embodiment, the internal network may be a communication service provider data network. A user logs into their computer account and is able to access programs located locally on that computer. However, in a network environment, applications that are accessed across the network may require the user to log in to each application separately. Single sign on allows a user to access a plurality of software systems or applications without being prompted to logon to each system individually. In a corporate environment, single sign on may allow a user to access corporate systems across an internal corporate network and provides a convenience to the user by utilizing authentication credentials obtained during the logon process to the local computer.

However, there may be some computers which are shared between more than one user, such as in a corporate retail store, where certain applications may need to be restricted from single sign on. These applications may be filtered and/or selected to require a user to sign on for each access from the shared computer. To accommodate limiting access to applications on the internal network using shared computers, the method describes configuring the shared computer to recognize applications which need to be restricted from single sign on and presenting the user with a manual login screen or window for these applications. Single sign on may be implemented through use of an authentication server. When a web browser is used to access a restricted application, the application may be accessed through an alias that resolves to the authentication server, but appears to the browser to be on an external network. Because the restricted application appears to be on an external network, the browser will not send authentication credentials to the authentication server. The method provides the convenience of single sign on to users of shared computers for less sensitive applications while providing secure access to applications which are restricted.

The authentication server is responsible for maintaining user credentials and associated application credentials for the user. When the authentication server receives a request to access an application it responds based on user credentials supplied with the request. If proper user credentials are supplied and the application credentials for the user are available, the authentication server starts the application, automatically logging in for the user. If user credentials are not received with the request, the authentication server starts the application and the user is prompted with a login screen for manually authenticating access to the application.

When an application is accessed through a web browser, the browser may utilize the uniform resource locator (URL) to identify the domain name of the host computer serving the application and determine whether the domain is on the internal network or an external network. If the domain is configured in the browser as on the internal network, the browser will pass user credentials to the authentication server to perform single sign on, allowing the application to be accessed without the need for an additional manual login. If the browser determines the application is on an external network, it will not send user credentials to the authentication server, which will result in the application requiring a manual login prior to allowing the user to access the application.

While it may be common practice for the browser to add specific hosts and domains to be treated as on the internal network, it is atypical functionality to restrict an application on the internal network to prevent single sign on for that application. To securely access the application on the internal network, the browser may be configured to treat a specific hostname or subdomain as on an external network, while the hostname or subdomain is part of a larger domain which is defined as on an internal network. The hostname or subdomain may be an alias that resolves to the internet protocol address of the authentication server in the internal network. When the browser resolves the aliased hostname or subdomain, it will determine the application is on an external network and will not send user credentials to the authentication server. This will result in the application presenting the user with a manual login screen or window.

The browser may use credentials retrieved from the computer operating system to send to the authentication server. A user goes through a logon sequence to access their account on the computer, and the user credentials may be saved by the computer operating systems. Programs executed on the computer, such as the browser, may retrieve the stored user credentials from the computer when the program determines it needs to provide the user credentials to the authentication server. The authentication server then validates the user credentials and accesses associated application credentials for the user to allow execution of the application without manual logon.

Turning now to FIG. 1, a system 10 for securely accessing an application on an internal network is described. The system comprises an external network 12, a firewall 14, an internal network 16, a computer 18, an authentication server 22 coupled to the internal network 16, and an application server 24 coupled to the internal network 16. The internal network 16 is separated from the external network 12 by the firewall 14, with the firewall 14 used to protect the internal network 16 from unauthorized access while permitting legitimate data communications to pass. While a single firewall 14 is illustrated in FIG. 1, it is understood that the system 10 may comprise a plurality of firewalls 14. The application server 24 hosts at least two applications over the internal network 16. The authentication server 22 provides single sign on to the applications hosted on the application server 24. It is understood that in an embodiment, the internal network 16 may be a network managed and operated by a communication service provider and may be referred to in some contexts as a communication service provider data network.

The computer 18 comprises a browser 20. The browser 20 may be used for retrieving and presenting information on a data communication network. The browser 20 utilizes a uniform resource locator (URL) to identify the information, which may be in the form of a web page, image, video, or application. The browser 20 may be configured to group sites based on certain conditions, including whether a site is hosted on the external network 12 or the internal network 16, and to apply security restrictions for each grouping. In an embodiment, the browser 20 is configured to provide filtered treatment and/or selective treatment to a restricted application hosted over the internal network 16. In an embodiment, the filtered treatment and/or selective treatment may result in requiring that a user sign-on to access the subject application, even though the computer 18 has already signed on. The browser 20 is configured to recognize the restricted application as hosted on the internal network 16. After an initial user sign on to the computer 18, in response to invoking one of a first plurality of applications hosted over the internal network 16, the browser 20 forwards user authentication credentials to the authentication server 22 based on a first host name provided by a first application invocation command.

The first host name is configured in the browser 20 as hosted over the internal network 16. Because the first host name is contained in the first application invocation command, the browser 20 treats the first application as being hosted on the internal network 16 and sends user authentication credentials to the authentication server 22. In response to invoking the restricted application hosted over the internal network 16, the browser 20 does not forward the user authentication credentials to the authentication server 22 based on an aliased host name provided by the restricted application invocation command, where the restricted application is not one of the first plurality of applications. The aliased host name is configured in the browser 20 as hosted over the external network 12. Because the aliased host name is contained in the restricted application invocation command, the browser 20 treats the restricted application as being hosted on the external network 12 and does not send user authentication credentials to the authentication server 22.

In an embodiment, user authentication credentials are based on data obtained during an interactive logon process to the computer 18 and comprises a user name and password. A user having an account on a computer 18 would typically go through the interactive logon process to access their account when starting up the computer 18 or starting a computing session by providing a user name and password. The operating system, for example Microsoft Windows®, stores these credentials until the user logs off of the computer 18, and these user authentication credentials may be used to support single sign on.

In an embodiment, the first host name is a subdomain of a larger domain and the larger domain is defined in the browser 20 as being on the internal data communication network 16. The browser 20 is configured to recognize the larger domain as being on the internal network 16. The subdomain of the larger domain is treated as being on the internal network 16 as well by virtue of being in the same domain. For example, the domain business.com may have a subdomain mail.business.com. When the browser 20 is configured to recognize business.com as being on the internal network 16, the subdomain mail.business.com is also considered to be on the internal network 16 based on the configuration of business.com. In an embodiment, the aliased host name is a subdomain of the larger domain and the aliased host name is defined in the browser 20 as being on an external data communications network. Utilizing an aliased host name allows the browser 20 to be configured separately for the subdomain. Because the aliased host name is a subdomain of the larger domain and as such would be recognized as being on the internal network 16, the aliased host name is configured separately in the browser 20 as being on the external network 12. This allows the application accessed via the aliased host name to bypass single sign on and require authentication to the application.

In an embodiment, the first host name provided by the first application invocation command is configured in the browser 20 as associated with an internal network 16. The first host name is contained in the uniform resource locator (URL) in the first application invocation command. The first application invocation command invokes the browser 20 and passes the uniform resource locator containing the first host name to the browser 20. The browser 20 recognizes the first host name as being on the internal network 16 and passes user credentials to the authentication server 22. In an embodiment, the aliased host name provided by the restricted application invocation command is configured in the browser 20 as associated with an external network 12. The aliased host name is contained in the uniform resource locator in the restricted application invocation command. The restricted application invocation command invokes the browser 20 and passes the uniform resource locator containing the aliased host name to the browser 20. The browser 20 recognizes the aliased host name as being on an external network 12 and does not pass user credentials to the authentication server 22.

Figure 2:
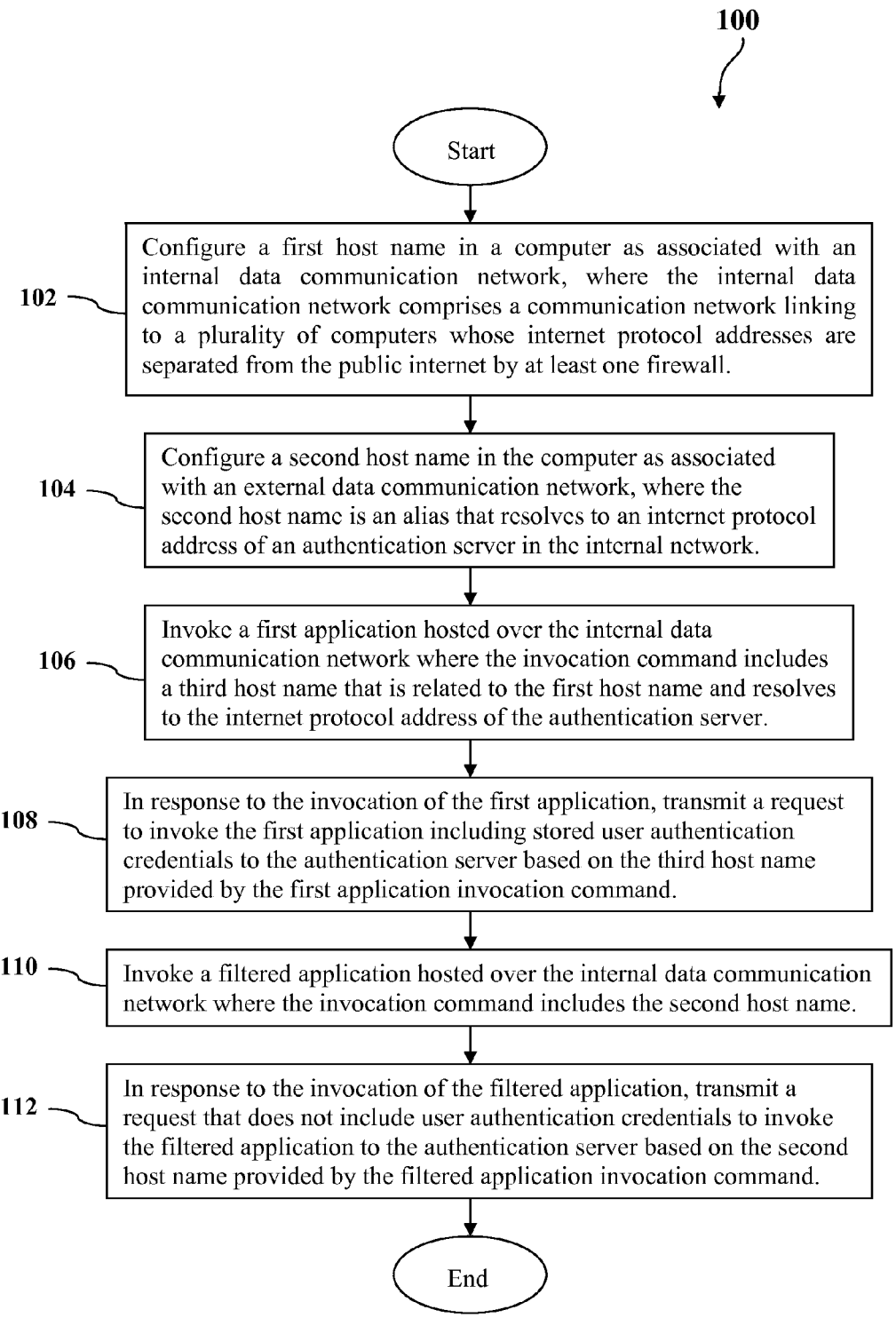
FIG. 2 is a flow chart of a method according to an embodiment of the disclosure.

Turning now to FIG. 2, a method 100 for securely accessing an application on an internal network is described. At block 102, a first host name in a computer 18 is configured as associated with an internal data communication network 16, where the internal data communication network 16 comprises a communication network linking to a plurality of computers 18 whose internet protocol addresses are separated from the public internet by at least one firewall 14. A domain name server (DNS) translates host names to internet protocol addresses. The first host name translates to an internet protocol address on the internal network 16. At block 104, a second host name in a computer 18 is configured as associated with an external data communication network 12, where the second host name is an alias that resolves to an internet protocol address of an authentication server 22 in the internal network 16. The authentication server 22 is configured as associated with the internal data communication network 16, and use of the alias for the second host name gives the ability to configure the second host name as associated with the external network 12 even though data is sent to the authentication server 22 on the internal network 16. At block 106, a first application hosted over the internal data communication network 16 is invoked where the invocation command includes a third host name that is related to the first host name and resolves to the internet protocol address of the authentication server 22. The third host name is related to the first host name and as such will be treated as associated with the internal network 16. The third host name resolves to the internet protocol address of the authentication server 22 and will thus send the first application invocation request to that internet protocol address. At block 108, in response to the invocation of the first application, a request to invoke the first application including stored user authentication credentials is transmitted to the authentication server 22 based on the third host name provided by the first application invocation command. Because the third host name is determined to be associated with the internal network 16, the user authentication credentials are included in the first application invocation request transmitted to the authentication server 22. At block 110, a restricted application hosted over the internal data communication network 16 is invoked where the invocation command includes the second host name. The restricted application invocation request is sent to the internet protocol address of the authentication server 22 based on the aliased second host name. At block 112, in response to the invocation of the restricted application, a request to invoke the restricted application that does not include user authentication credentials is transmitted to the authentication server 22 based on the second host name provided by the restricted application invocation command. Because the second host name is determined to be associated with the external network 12, the user authentication credentials are not included in the restricted application invocation request transmitted to the authentication server 22.

In an embodiment, the third host name is a subdomain of the first host name. A host name is a domain name assigned to a host computer, usually consisting of a combination of the host's local name with its parent domain's name. The first host name is the parent domain and the third host name is a subdomain of the parent domain. Because subdomains are part of their parent domains, configuring the parent domain as associated with the internal network 16 also gives the subdomains the same association. In an embodiment, the second host name is a subdomain of the first host name. Again, the first host name is the parent domain and the second host name is a subdomain of the parent domain. Therefore, to associate the second host name with the external network 12, it is configured separately from the first host name; otherwise it would inherit the association with the internal network 16 from the parent domain.

In an embodiment, the computer 18 is shared by a plurality of users and where after a first logon to the computer 18 other users employ the computer 18 resources. Single sign on is used to simplify access and authentication issues for users, and is efficient on a computer 18 used by a single user. However, it may pose problems on computers 18 shared between users, where it may not be desirable for a user to access applications under another user's login and where it may be inconvenient for each user to logout when finished using an application. For example, in a retail store environment you may have a computer 18 which is shared by the sales associates and used for accessing corporate applications as well as completing sales transactions. The time it would take to have each sales associate login and logout after each use of the computer 18 may impact customer service. Additionally, some corporate applications may contain sensitive information in a user account that they would not want to be seen by other users. The ability to configure applications with sensitive information to not pass user credentials to the authentication server 22, thus requiring manual login for that application by each user, enables the sales associates to share the computer without fear of exposing the sensitive information. Instead of having to completely login and logout of the computer, each associate can manually login and logout of the application, protecting the sensitive information without affecting other workflows on the computer.

In an embodiment, the method 100 further comprises configuring the second host name in a second computer 18 where the second host name is not associated with an external data communication network 12 and where the second host name is related to the first host name and is an alias that resolves to the internet protocol address of the authentication server 22 in the internal network 16. By not specifically configuring the second host name in the second computer 18, the second host name will be associated with the internal network 16 based on its relationship with the first host name. A restricted application hosted over the internal data communication network 16 is invoked where the invocation command includes the second host name. The restricted application invocation request is sent to the internet protocol address of the authentication server 22 based on the aliased second host name. In response to the invocation of the restricted application, a request to invoke the restricted application that includes stored user authentication credentials is transmitted to the authentication server 22 based on the second host name provided by the restricted application invocation command. Because the second host name is determined to be associated with the internal network 16, the user authentication credentials are included in the restricted application invocation request transmitted to the authentication server 22. The second computer 18 may be in a private office with no concerns about shared access of sensitive information, therefore the second host name does not need to be configured to be associated with an external network 12. The restricted application is allowed to utilize single sign on in this case on the second computer 18.

In an embodiment, the method 100 further comprises the authentication server 22 retrieving associated user application credentials for the first application in response to receiving stored user authentication credentials from the first application invocation. The authentication server 22 retrieves the stored user credentials for the first application and invokes the first application, passing the user credentials to the first application. In an embodiment, the authentication server 22 presents a login screen for the restricted application in response to receiving the restricted application invocation that does not include stored user authentication credentials. Because the restricted application invocation did not include user authentication credentials, the authentication server 22 does not retrieve stored user credentials for the restricted application and invokes the restricted application without passing user credentials, resulting in the user being presented with a login screen.

Figure 3:
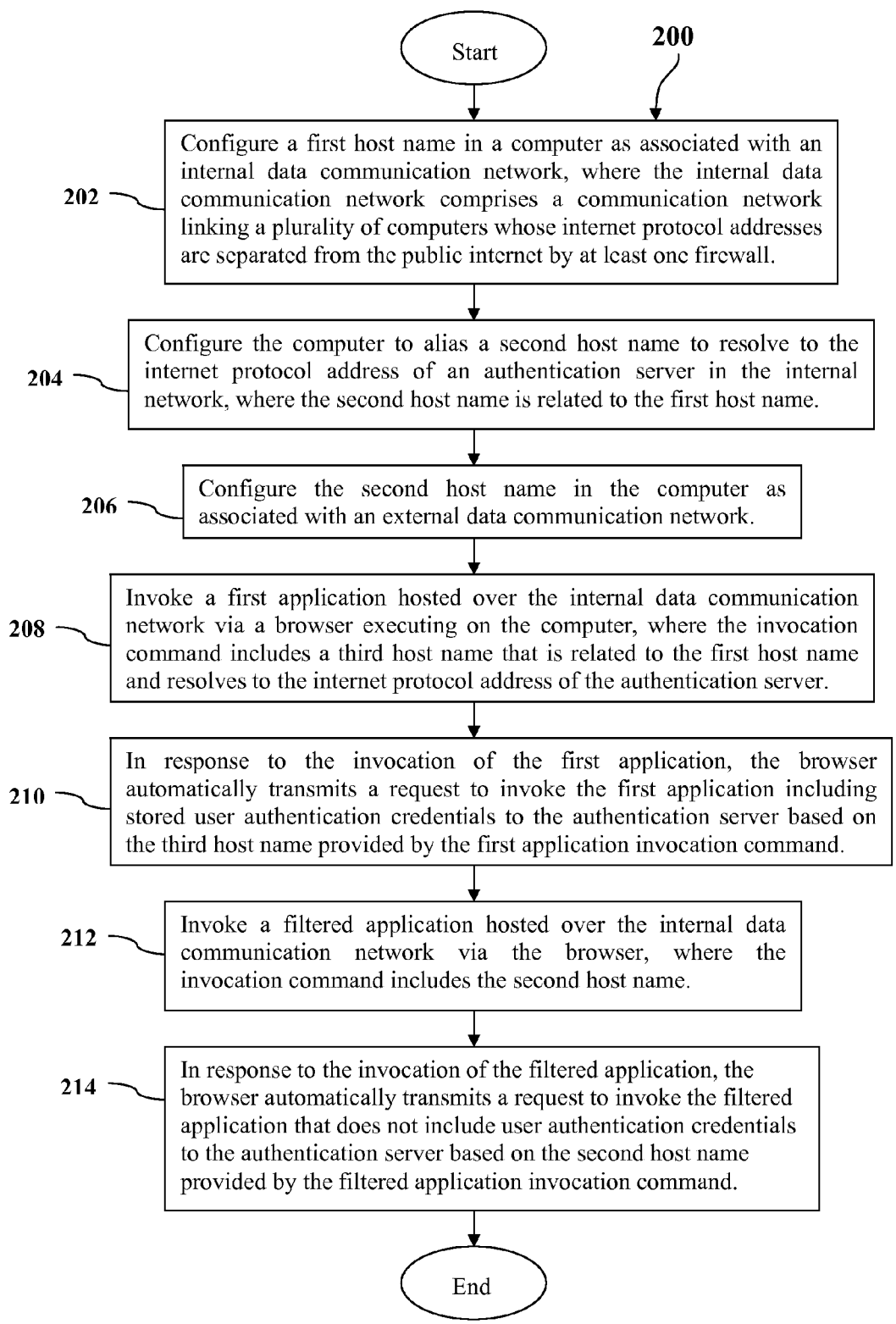
FIG. 3 is a flow chart of a method according to an embodiment of the disclosure.

Turning now to FIG. 3, a method 200 for securely accessing an application on an internal network 16 is described. At block 202, a first host name in a computer 18 is configured as associated with an internal data communication network 16, where the internal data communication network 16 comprises a communication network linking a plurality of computers 18 whose internet protocol addresses are separated from the public internet by at least one firewall 14. The first host name translates to an internet protocol address on the internal data communication network 16. At block 204, the computer 18 is configured to alias a second host name to resolve to the internet protocol address of an authentication server 22 in the internal network 16, where the second host name is related to the first host name. The second host name is related to the first host name and will therefore be treated as associated with the internal network 16. At block 206, the second host name in the computer 18 is configured as associated with an external data communication network 12. The use of the alias for the second host name gives the ability to configure the second host name as associated with an external network 12 even though data is sent to the authentication server 22 on the internal network 16. At block 208, a first application hosted over the internal data communication network 16 is invoked via a browser 20 executing on the computer 18, where the invocation command includes a third host name that is related to the first host name and resolves to the internet protocol address of the authentication server 22. The third host name is related to the first host name and the browser 20 will therefore treat the first application as associated with the internal network 16. At block 210, in response to the invocation of the first application, a request to invoke the first application including stored user authentication credentials is automatically transmitted by the browser 20 to the authentication server 22 based on the third host name provided by the first application invocation command. Because the third host name is determined to be associated with the internal network 16, the user authentication credentials are included in the first application invocation request transmitted to the authentication server 22. At block 212, a restricted application hosted over the internal data communication network 16 is invoked via the browser 20, where the invocation command includes the second host name. The second host name is configured to be associated with an external network 12 and the browser 20 will therefore treat the restricted application as associated with the external network 12. At block 214, in response to the invocation of the restricted application, a request to invoke the restricted application that does not include user authentication credentials is automatically transmitted by the browser 20 to the authentication server 22 based on the second host name provided by the restricted application invocation command. Because the second host name is determined to be associated with an external network 12, the user authentication credentials are not included in the restricted application invocation request transmitted to the authentication server 22.

In an embodiment, the stored user authentication credentials are based on data obtained during an interactive logon process and comprises a user name and a password. A user having an account on a computer 18 would typically go through the interactive logon process to access their account when starting up the computer 18 or starting a computing session by providing a user name and password. The operating system, for example Microsoft Windows®, stores these credentials until the user logs off of the computer 18, and these user authentication credentials may be used to support single sign on. In an embodiment, the user authentication credentials are retrieved by the browser 20 using the NT LAN Manager (NTLM) protocol. NT LAN Manager is a MICROSOFT security protocol that provides authentication to users. The browser 20 uses the NT LAN Manager protocol to retrieve the stored user authentication credentials to pass to the authentication server 22.

In an embodiment, the alias to the second host name is a subdomain of the first host name and the aliased host name is defined in the browser 20 as being on an external data communication network 12. The first host name is the parent domain and the alias to the second host name is a subdomain of the parent domain. To associate the aliased host name with the external network 12 it is configured in the browser 20 so it does not inherit the association with the internal network 16 from the parent domain. In an embodiment, the browser 20 determines the associated data communication network based on the fully qualified domain name (FQDN) of the first host name, second host name, and third host name. A fully qualified domain name is a domain name that specifies its exact location in the hierarchy of the domain name system. For example, given the parent domain name parent.com, the fully qualified domain name of a local host firsthost is firsthost.parent.com.

In an embodiment, configuring the first host name in the computer 18 as associated with the internal network 16 comprises adding the first host name to a configuration file defining an internal internet zone. An application, such as a browser 20, is used for retrieving and presenting information resources over a network. Because the browser 20 is used for accessing resources on an external network 12, it may have built in security that groups sites into zones, with all sites in a zone subject to security restrictions. Defining the first host name in a configuration file as in the internal internet zone allows the applications running on the computer 18 to apply appropriate security when retrieving information from the first host name. In an embodiment, configuring the second host name in the computer 18 as associated with the external network 12 comprises adding the second host name to a configuration file defining an external internet zone. Defining the second host name in a configuration file as in the external internet zone allows the applications running on the computer to apply appropriate security when retrieving information from the second host name.

Figure 4:
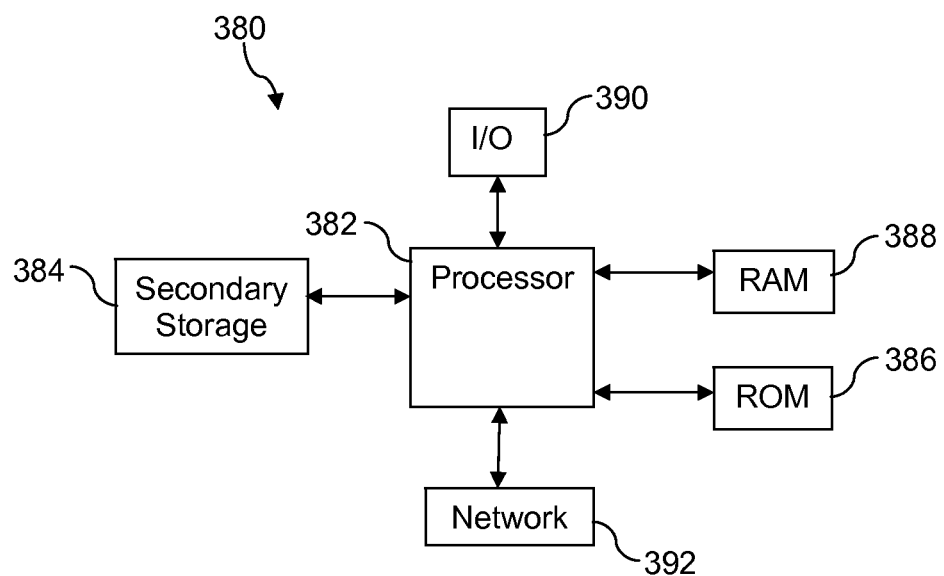
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for securely accessing an application on an internal network, comprising:
    configuring a first host name associated with an unrestricted application in a computer as associated with an internal data communication network, wherein the unrestricted application is located in the internal data communication network and eligible for single sign on, and wherein the internal data communication network comprises a communication network linking a plurality of computers whose internet protocol addresses are separated from the public Internet by at least one firewall;
    invoking the unrestricted application hosted over the internal data communication network with an unrestricted application invocation command, wherein the unrestricted application invocation command includes a second host name that is related to the first host name and resolves to an internet protocol address of an authentication server in the internal data communication network;
    in response to the invocation of the unrestricted application, transmitting a request to invoke the unrestricted application that includes stored user authentication credentials to the authentication server based on the second host name provided by the unrestricted application invocation command so as to enable single sign on for the unrestricted application;
    configuring an aliased host name associated with a restricted application in the computer as associated with an external data communication network, wherein the restricted application is located in the internal data communication network and ineligible for single sign on, and wherein the aliased host name resolves to the internet protocol address of the authentication server in the internal data communication network;
    invoking the restricted application hosted over the internal data communication network with a restricted application invocation command, wherein the restricted application invocation command includes the aliased host name;
    in response to the invocation of the restricted application, transmitting a request that does not include the stored user authentication credentials to invoke the restricted application to the authentication server based on the aliased host name provided by the restricted application invocation command so as to prevent single sign on for the restricted application; and
    presenting a manual login requiring an additional sign-on prior to allowing access to the restricted application.

2. The method of claim 1, wherein the second host name is a subdomain of the first host name.

3. The method of claim 1, wherein the alaiased host name is a subdomain of the first host name.

4. The method of claim 1, wherein the computer is shared by a plurality of users and wherein after a first logon to the computer other users employ the computer resources.

5. The method of claim 1, further comprising:
    configuring a second computer, wherein the aliased host name is not associated with an external data communication network, and wherein the aliased host name is related to the first host name and is an alias that resolves to the internet protocol address of the authentication server in the internal network;
    invoking a restricted application hosted over the internal data communication network, wherein the restricted application invocation command includes the aliased host name; and
    in response to the invocation of the restricted application, transmitting a request to invoke the restricted application that includes stored user authentication credentials to the authentication server based on the aliased host name provided by the restricted application invocation command.

6. The method of claim 1, further comprising the authentication server retrieving associated user application credentials for the unrestricted application in response to receiving the stored user authentication credentials from the unrestricted application invocation command.

7. The method of claim 1, wherein the manual login is presented in response to receiving the restricted application invocation command that does not include the stored user authentication credentials.

8. A system for securely accessing an application on a communication service provider data network from a computer of the communication service provider data network, wherein the communication service provider data network comprises an internal data network linking a plurality of computers whose internet protocol addresses are separated from an external public Internet by at least one firewall, comprising:
    a computer system having a browser application configured to provide filtered treatment to a restricted application hosted over the communication service provider data network, wherein, after an initial user sign on, the browser application,
        in response to invoking one of a plurality of unrestricted applications hosted over the communication service provider data network, forwards user authentication credentials to an authentication server based on a first host name provided by an unrestricted application invocation command so as to enable single sign on for the plurality of unrestricted applications, wherein the authentication server is coupled to the communication service provider data network and promotes single sign-on to at least two applications hosted over via the communication service provider data network, in response to invoking the restricted application hosted over the communication service provider data network, does not forward user authentication credentials to the authentication server based on an aliased host name provided by the restricted application invocation command so as to prevent single siqn on for the restricted application, wherein the restricted application is located in the communication service provider data network and ineligible for single sign on, and wherein the aliased host name provided by the restricted application invocation command is associated with the external public Internet, and presents a manual login requiring an additional sign-on prior to allowing access to the restricted application.

9. The system of claim 8, wherein user authentication credentials are based on data obtained during an interactive logon process to the computer system and comprises a user name and a password.

10. The system of claim 8, wherein the first host name is a subdomain of a larger domain and wherein the larger domain is defined in the browser as being on the communication service provider data network.

11. The system of claim 10, wherein the aliased host name is a subdomain of the larger domain and wherein the aliased host name is defined in the browser as being on an external data communication network.

12. A method for securely accessing an application on an internal network, comprising:

configuring a first host name associated with an unrestricted application in a computer as associated with an internal data communication network, wherein the unrestricted application is located in the internal data communication network and eligible for single sign-on, and wherein the internal data communication network comprises a communication network linking a plurality of computers whose internet protocol addresses are separated from the public Internet by at least one firewall;

invoking the unrestricted application hosted over the internal data communication network with an unrestricted application invocation command via a browser executing on the computer, wherein the unrestricted application invocation command includes a second host name that is related to the first host name and resolves to an internet protocol address of an authentication server in the internal data communication network;

in response to the invocation of the unrestricted application, the browser automatically transmitting a request to invoke the unrestricted application that includes stored user authentication credentials to the authentication server based on the second host name provided by the unrestricted application invocation command so as to enable single sign on for the unrestricted application;

configuring an aliased host name associated with a restricted application in the computer as associated with an external data communication network, wherein the restricted application is located in the internal data communication network and ineligible for single sign-on, and wherein the aliased host name resolves to the internet protocol address of the authentication server in the internal data communication network;

invoking the restricted application hosted over the internal data communication network via the browser with a restricted application invocation command, wherein the restricted application invocation command includes the aliased host name;

in response to the invocation of the restricted application, the browser automatically transmitting a request to invoke the restricted application that does not include the stored user authentication credentials to the authentication server based on the aliased host name provided by the restricted application invocation command so as to prevent single sign on for the restricted application; and presenting a manual login requiring an additional sign-on prior to allowing access to the restricted application.

13. The method of claim 12, wherein the stored user authentication credentials are based on data obtained during an interactive logon process and comprises a user name and a password.

14. The method of claim 13, wherein user authentication credentials are retrieved by the browser using the NT LAN Manager (NTLM) protocol.

15. The method of claim 12, wherein the aliased host name is a subdomain of the first host name and wherein the aliased host name is defined in the browser as being on an external data communication network.

16. The method of claim 12, wherein configuring the first host name in the computer as associated with the internal network comprises adding the first host name to a configuration file defining an internal intranet zone.

17. The method of claim 12, wherein configuring the aliased host name in the computer as associated with the external network comprises adding the aliased host name to a configuration file defining an external internet zone.

18. The method of claim 12, wherein the browser determines the associated data communication network based on the fully qualified domain name (FQDN) of the first host name, aliased host name, and second host name.

* * * * *